United States Patent

[11] 3,601,626

[72] Inventors Hans Hoffmann Harks-Heide; Ludwig Wittorf, Harks-Heide; Hans-Wilhelm Neuhaus, Hamburg; Uwe Bertram, Hamburg, all of, Germany
[21] Appl. No. 802,576
[22] Filed Feb. 26, 1969
[45] Patented Aug. 24, 1971
[73] Assignee U. S. Philips Corporation New York, N.Y.
[32] Priority Feb. 29, 1968
[33] Germany
[31] P 15 37 986.9

[54] LOGIC ELEMENT
4 Claims, 2 Drawing Figs.

[52] U.S. Cl. .................... 307/203, 307/218, 307/237, 340/347
[51] Int. Cl. .................... H03k 19/08
[50] Field of Search .................... 307/237, 203, 218; 340/347; 235/155

[56] References Cited
UNITED STATES PATENTS

| | | | |
|---|---|---|---|
| 2,851,604 | 9/1958 | Clapper | 307/237 |
| 2,877,447 | 3/1959 | Kenrich | 235/155 |
| 2,945,221 | 7/1960 | Hinton | 235/155 |
| 2,989,235 | 6/1961 | Dickinson | 235/155 |
| 3,425,053 | 1/1969 | Anderson | 235/155 |

*Primary Examiner*—Donald D. Forrer
*Assistant Examiner*—David M. Carter
*Attorney*—Frank R. Trifari

ABSTRACT: A digital logic element in which a single voltage supply provided current to an input circuit connected in series with a diode biased in the forward conduction region. Voltage for supplying part of a digital output circuit in the element is taken from the junction of the input circuit and the diodes.

Figure 1:
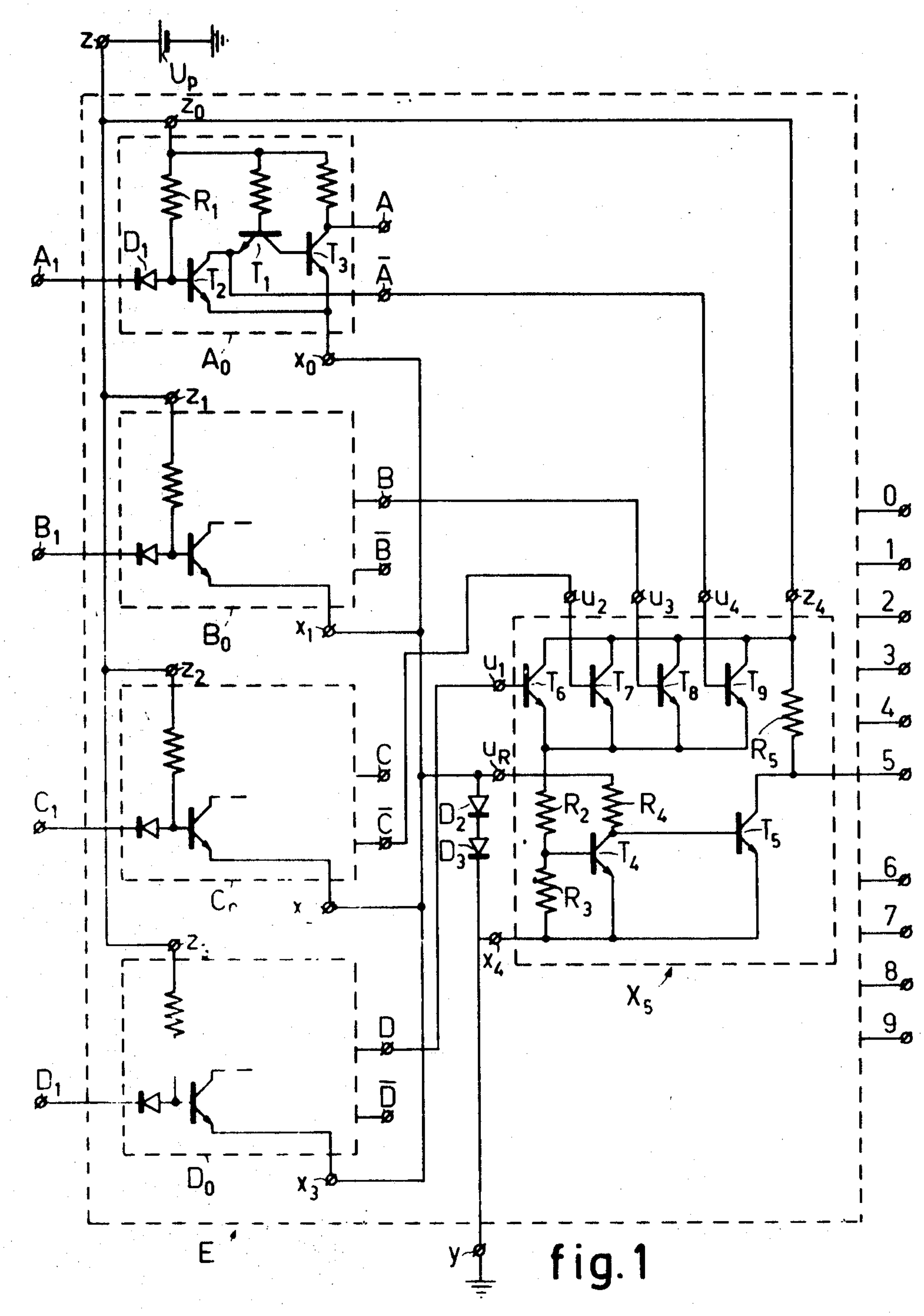

INVENTORS
HANS HOFFMANN
LUDWIG WITTORF
HANS-WILHELM NEUHAUS
UWE BERTRAM
BY AGENT

| U ≙ „0" | I $A_1$ | $B_1$ | $C_1$ | $D_1$ | 1 | 2 |
|---|---|---|---|---|---|---|
| 0 | 0 | 0 | 0 | 0 | $\bar{A} . \bar{B} . \bar{C} . \bar{D}$ | $A + B + C + D$ |
| 1 | 1 | 0 | 0 | 0 | $A . \bar{B} . \bar{C} . \bar{D}$ | $\bar{A} + B + C + D$ |
| 2 | 0 | 1 | 0 | 0 | $\bar{A} . B . \bar{C} . \bar{D}$ | $A + \bar{B} + C + D$ |
| 3 | 1 | 1 | 0 | 0 | $A . B . \bar{C} . \bar{D}$ | $\bar{A} + \bar{B} + C + D$ |
| 4 | 0 | 0 | 1 | 0 | $\bar{A} . \bar{B} . C . \bar{D}$ | $A + B + \bar{C} + D$ |
| 5 | 1 | 0 | 1 | 0 | $A . \bar{B} . C . \bar{D}$ | $\bar{A} + B + \bar{C} + D$ |
| 6 | 0 | 1 | 1 | 0 | $\bar{A} . B . C . \bar{D}$ | $A + \bar{B} + \bar{C} + D$ |
| 7 | 1 | 1 | 1 | 0 | $A \quad B \quad C . \bar{D}$ | $\bar{A} + \bar{B} + \bar{C} + D$ |
| 8 | 0 | 0 | 0 | 1 | $\bar{A} . \bar{B} . \bar{C} . D$ | $A + B + C + \bar{D}$ |
| 9 | 1 | 0 | 0 | 1 | $A . \bar{B} . \bar{C} . D$ | $\bar{A} + B + C + \bar{D}$ |

fig.2

INVENTORS
HANS HOFFMANN
LUDWIG WITTORF
HANS-WILHELM NEUHAUS
UWE BERTRAM
BY Frank R. Trifari
AGENT

LOGIC ELEMENT

The invention relates to a logic element for use in logic element systems which have predetermined supply and signal voltages and include at least one input and one output circuit. In many known logic elements a logic input signal is frequently used several times, the control stage which delivers the logic signal having to be protected from being overloaded. The inverse of the logic signal often also is to be applied and this may in many cases result in the number of input terminals of the logic element being insufficient so that one must forego the application of the inverse of the logic input signal. This results in that frequently additional inverters are required before the desired logic interconnection proper can be made. This has the drawback that the transit time of the logic element is unnecessarily increased, the term "transit time" being defined as the time which elapses between the application of an input signal and the appearance of an output signal at an output of the logic element. This transit time may be shortened by reducing the resistivity both of the inverters and of the parts of the elements in which the logic interconnection proper takes place. However, a narrow limit is set to this decrease which is determined by the maximum permissible dissipation of the housing accommodating the logic element. A reduction of the supply voltage would solve this problem, but this generally is not permitted.

Circuit arrangements are known which operate according to the current transfer principle (Emitter Coupled Logic) and which make logic connections by means of series and parallel connected current switches. These circuit arrangements have the disadvantages, however, that they can only be adapted to logic elements designed according to a different technique, (for example, Diode Transistor Logic or Transistor Transistor Logic) by the use of an additional supply voltage. Furthermore, in these arrangements only the current required for effecting a single logic connection is switched. Hence this current cannot be used to make other logic connections.

It is an object of the present invention to provide a logic element which does not have the above disadvantages, and the invention is characterized in that at least part of the input circuit and at least part of the output circuit are connected in series with the voltage supply source, means being provided to ensure that the intermediate voltage set up at the junction point of the said parts of the input and output circuits is maintained constant irrespective of the logic condition of the logic element.

Features and advantages of the invention will appear from the following description of an embodiment thereof, given by way of example only, with reference to the accompanying drawings, in which:

FIG. 1 shows schematically an embodiment of a logic element in accordance with the invention, FIG. 2 is the truth table of the logic element shown in FIG. 1.

Referring to FIG. 1, the logic element E shown is a binary-to-decimal code converter having four signal inputs $A_1$, $B_1$, $C_1$ and $D_1$ and 10 signal outputs 0 to 9. The element E shown in FIG. 1 comprises four input circuit $A_0$, $B_0$, $C_0$ and $D_0$, which are connected to the inputs $A_1$, $B_1$, $C_1$ and $D_1$, respectively. Each of the signal outputs 0 to 9 is connected to an output circuit. For the sake of clarity, only the output circuit associated with the signal output 5 is shown completely. The output circuits associated with the other signal output are of identical structure. From FIG. 1 it will be easily seen that the input circuit $A_0$ and the inverter stage $T_4$ of the output circuit are connected in series with the voltage supply source $U_p$ and that the voltage at the junction of the input and output circuits is maintained constant by means of diodes $D_2$ and $D_3$. The input circuit $A_0$, $B_0$, $C_0$ and $D_0$ each comprise two transistors $T_2$ and $T_3$ operating as inverters, the emitters of these transistors being connected to the supply points $x_0$, $x_1$, $x_2$ and $x_3$ of the respective input circuit. In the input circuit $A_0$, the base of the transistor $T_2$ is connected through a semiconductor diode $D_1$ to the signal input $A_1$ and also through a resistor $R_1$ to the supply point $z_0$ of the input circuit $A_0$. The collector of the transistor $T_2$ is connected to the base of the transistor $T_3$ through the emitter collector path of the transistor $T_1$ operating as a switch. The doubly inverted logic signal A is taken from the collector of the transistor $T_3$, and the inverted logic signal $\overline{A}$ is taken from the collector of the transistor $T_2$. The supply points $z_0$, $z_1$, $z_2$ and $z_3$ of the respective input circuits $A_0$, $B_0$, $C_0$ and $D_0$ are connected to a supply terminal $Z$ of the logic element which is connected to the voltage supply source $U_p$. The supply point $x_0$, $x_1$, $x_2$ and $x_3$ are not at earth potential but are connected to earth through the diodes $D_2$ and $D_3$. This ensures that the threshold voltage for all four signal inputs $A_1$, $B_1$, $C_1$ and $D_1$ is equal. In addition, in this manner two diodes and a base resistor are saved in each input circuit which normally are required to provide the threshold voltage.

The output circuit $x_5$ includes an OR-gate which has the advantage that it can be accommodated in a single common island in an integrated circuit. It comprises transistors $T_6$, $T_7$, $T_8$ and $T_9$ the collectors of which are connected to the supply point $z_4$ of the output circuit $x_5$. The bases of the latter transistors constitute the signal inputs $U_1$, $U_2$, $U_3$ and $U_4$ respectively of the output circuit $x_5$. The emitters of these transistors are connected through the series combination of the resistors $R_2$ and $R_3$ to the supply point $x_4$ of the output circuit $x_5$, which supply point is connected to the supply terminal Y of the logic element, which terminal is connected to earth. The junction point of the resistors $R_2$ and $R_3$ is connected to the base of the transistor $T_4$, the collector of which is connected to the base of the transistor $T_5$. The emitters of the transistors $T_4$ and $T_5$ are connected to the supply point $x_4$ of the output circuit $x_5$. The collector of the transistor $T_5$ is connected through the resistor $R_5$ to the supply point $z_4$ of the output circuit $x_5$, which point is connected to the supply terminal $z$ of the logic element. The collector of the transistor $T_4$ is connected through the resistor $R_4$ to the supply point $U_R$ of the output circuit $x_5$, which supply point is connected to the junction of the supply points $x_0$, $x_1$, $x_2$ and $x_3$ of the input circuit. The output circuits associated with the other signal outputs are identical structure. All the supply points $z_4$ of the output circuit are connected to the supply terminal $z$ of the logic element, all the supply points $x_4$ of the output circuits are connected to the supply terminal $y$ of the logic element and all the supply points $U_R$ of the output circuits are connected to the junction of the supply points $x_0$, $x_1$, $x_2$ and $x_3$ of the input circuits. Each of the signal inputs $U_1$, $U_2$, $U_3$ and $U_4$ of each of the output circuits is connected to a signal output of one of the input circuits, which will be discussed more fully with reference to FIG. 2.

FIG. 2 is a truth table of a binary-to-decimal code converter. It is assumed that a logical 1 is distinguished from a logical 0 by a higher potential (positive logic). It is further assumed that in the embodiment described decoding is continued to "0," which means that at a given combination of the values of the input signals the logical 0 appears at the respective signal output. This means that all the functions shown in column 1 of the table are to be inverted, as is shown in column 2. The functions shown in column 2 can be achieved by means of a single OR-gate or by an AND-gate followed by an inverter. In the embodiment shown in FIG. 1, each output circuit includes an OR-gate ($T_6$, $T_7$, $T_8$ and $T_9$) which is followed by a double inverter circuit ($T_4$, $T_5$). This double inverter circuit provides an increased load capacity of the signal outputs 0 to 9, whilst the contribution of the two inverters to the overall transit time is negligible. From column 2 of the truth table it can readily be read which input signals are to be applied to the signal inputs of each of the output circuits. Thus, for example, the signals $\overline{A}$, $\overline{B}$, $\overline{C}$ and $\overline{D}$ are applied to the signal inputs of the output circuit $X_5$. If, therefore, the logical signals 1, 0, 1, 0 are applied to the inputs $A_1$, $B_1$, $C_1$ and $D_1$ respectively, the logical signals 0, 0, 0, 0 are applied to the inputs of the output circuit $X_5$. This implies that the transistors $T_4$, $T_6$, $T_7$, $T_8$ and $T_9$ will be nonconducting and the transistor $T_5$ will be conducting. Consequently, a logical 0 appears at the output 5.

Since the first inverter stages ($T_4$) of each of the output circuits at least nine transistors will be conducting and the sudden potential variations at the collectors of these transistors are very small (base-emitter voltage of $T_5$ minus collector-emitter saturation voltage of $T_4$), a lower supply voltage $U_R$ may advantageously be used for the transistors. As a result not only will the dissipation be considerably reduced, but also the resistors $R_4$ in each of the output circuits may be made smaller, which especially in integrated circuits provides a considerably saving in crystal surface.

The division of the supply voltage as described with reference to the embodiments shown in FIG. 1 can be used in many other circuits. The principle described can be used both in circuits comprising discrete components and in integrated circuits.

What we claim is:

1. A logic element for use in a logic system having predetermined supply and signal voltages, comprising an input circuit, an output circuit and a voltage regulating circuit; said input circuit comprising an input terminal for receiving digital signals above and below a predetermined first voltage level, a first conduction path means connected to the input terminal for permitting current to flow therethrough in response to a voltage on the input terminal above a first voltage level and for preventing current from flowing therethrough in response to a voltage level on the input terminal below the first voltage level, a second conduction path means connected to the input terminal for permitting a current to flow therethrough in response to a voltage on the input terminal below the first voltage level and for preventing current from flowing therethrough in response to a voltage on the input terminal above the first voltage level, means for connecting one side of each conduction path means to the supply voltage of the logic system, and means for connecting the other sides of the conduction path means remote from the voltage supplied to a single point; said voltage regulating circuit comprising means for maintaining a constant voltage across the regulating circuit in response to variable currents passing therethrough; means for connecting the regulating circuit between the single point and ground; and means for connecting a part of the output circuit parallel with the regulating circuit.

2. A logic circuit as claimed in claim 1, wherein the voltage maintained by the regulating circuit is approximately equal to the first voltage level.

3. A logic circuit as claimed in claim 1, wherein the regulating circuit comprises a constantly forward biased diode.

4. A logic circuit as claimed in claim 1, wherein the entire logic circuit is integrated in a semiconductor circuit.